(No Model.)
F. BAIN.
TROLLEY FOR ELECTRIC MOTOR CARS.
No. 433,611. Patented Aug. 5, 1890.
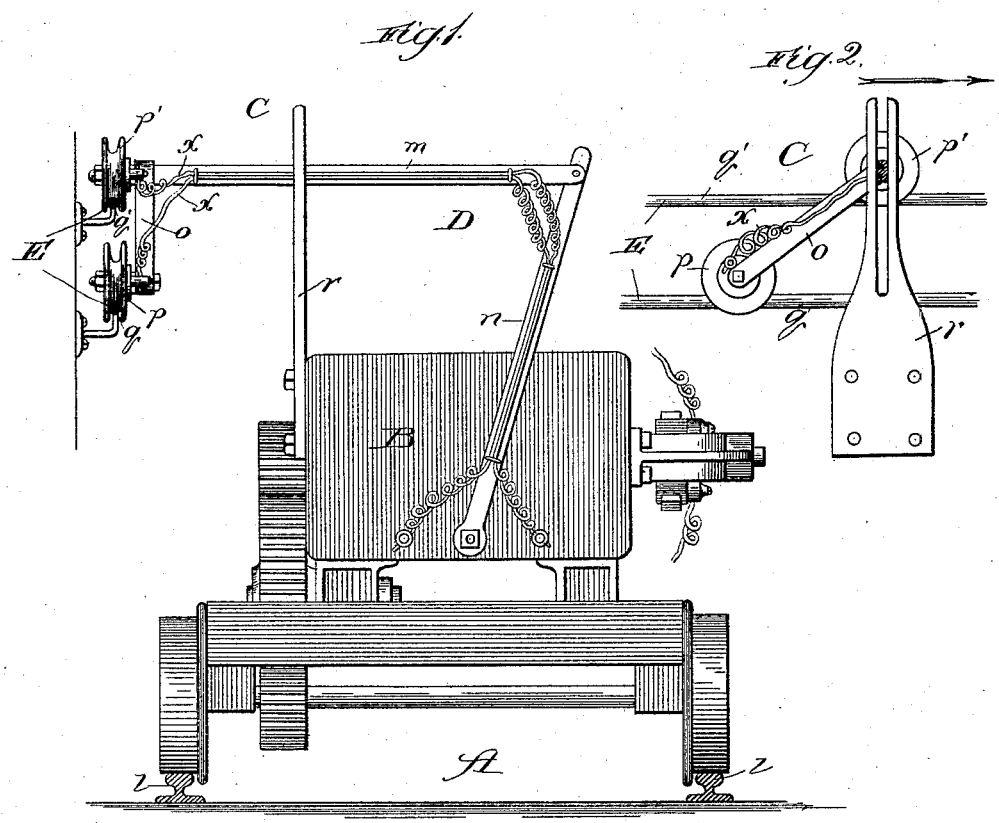
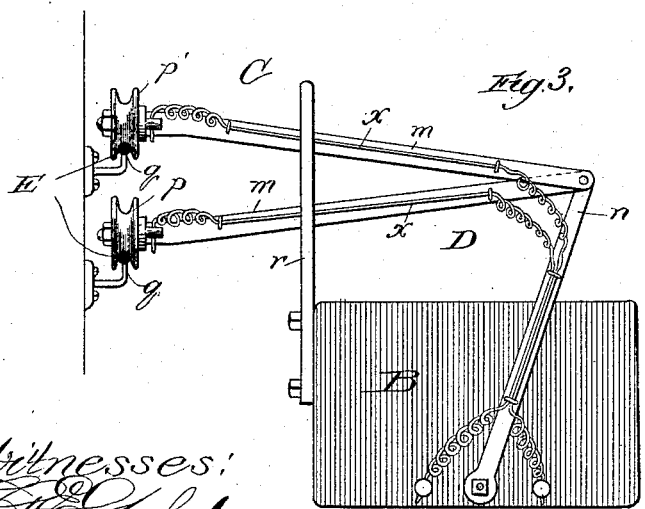

UNITED STATES PATENT OFFICE.

FORÉE BAIN, OF CHICAGO, ILLINOIS.

TROLLEY FOR ELECTRIC-MOTOR CARS.

SPECIFICATION forming part of Letters Patent No. 433,611, dated August 5, 1890.

Application filed February 17, 1890. Serial No. 340,800. (No model.)

*To all whom it may concern:*

Be it known that I, FORÉE BAIN, a citizen of the United States, residing at Chicago, in the county of Cook and State of Illinois, have invented a new and useful Improvement in Trolleys for Electric-Motor Cars, of which the following is a specification.

My invention relates to an improvement in trolleys for use with electric-motor cars generally, though I have designed my present improvement for especial use with mining-machines driven by electric motors and serving the purpose of cutting a longitudinal opening in the wall of mineral, thereby to undermine it and render its dislodgment by blasting the more easy.

The object of my improvement is to provide a trolley-connection for the motor which shall insure contact with the lines of the overhead or lateral circuit notwithstanding irregularities in the latter, as in the case of unequal sagging thereof and the like.

It is also my object to provide such a trolley mechanism as shall not require different adjusting for the forward and backward movement of the carriage, and it is further my object to provide a generally-improved form of trolley device for the purpose stated.

To these ends my invention consists in the general construction of my improvement; and it also consists in details of construction and combinations of parts.

In the accompanying drawings, Figure 1 shows an undercutting mining-machine in rear elevation provided with my improved trolley device operatively applied. Fig. 2 is a view in side elevation of the trolley device; and Fig. 3, a view showing the trolley device as presented in Fig. 1, but illustrating a modified construction thereof.

A denotes an undercutting mining-machine having an electric motor B, of any suitable or well-known construction for the purpose, supported on that part of its frame portion which carries the cutters, and is movable by the power of the motor properly geared to it longitudinally in a forward direction to advance the cutters to produce the desired depth of undermining opening they form, and in a backward direction to withdraw the cutters after they have formed the opening of the desired depth. A machine of the kind referred to is shown and described in all its details in my application for Letters Patent, Serial No. 340,799, filed concurrently herewith on the 17th day of February, 1890.

To one lateral side of the motor B, near its rear end, is secured an upright bar $r$, which should extend to or beyond the upper of the two wires $q$ and $q'$, supported along the side near the top of the mine to form the circuit, and the bar $r$ is bifurcated, as shown, to constitute it a guide, preferably from near a point on the plane of the lower of the two circuit-wires to its upper end. The rollers $p$ and $p'$ of the trolley device C, for traveling, respectively, on the wires $q$ and $q'$ of the circuit E, may be connected together one to follow the other, as usual, and, as shown in Figs. 1 and 2, by a connecting-bar $o$, secured near its opposite ends to the journal ends of the rollers, the rollers through their connecting medium $o$ being pivotally connected with the machine A, preferably at the rear side of the motor, by a jointed arm or lever D. The upright arm $n$ of the jointed connecting medium D is pivoted at its lower end to the machine, as at the rear side of the motor, and the arm $m$ thereof is pivoted at one end to the upper end of the arm $n$, extends thence at an angle through the guide afforded by the bifurcated bar $r$, and is secured at its farther extremity to the roller-connecting bar $o$. The jointed lever D affords a convenient guide-support, as shown, for the wires $x$, connecting the trolley-rollers with the motor.

As will readily be seen from the foregoing description, the connecting medium for the trolley device is so flexible that whatever inequalities—change of direction or of distance from the plane of the track $l$—may occur in the lines the rollers will readily conform thereto and thus always be maintained in proper contact with the line-wires of the circuit. The guide-bar $r$ braces the jointed arm D and holds it against displacement.

Instead of connecting the rollers $p$ and $p'$ by the connecting-bar $o$, and thence connecting them through a single arm $m$ with the pivotal arm $n$, they may, as shown in Fig. 3, be each separately connected pivotally by an arm $m$, passed through the guide-bar $r$, with the upper end of the arm $n$, this construction affording the same advantages as that shown in Figs. 1 and 2.

What I claim as new, and desire to secure by Letters Patent, is—

1. In combination with a car having an electric motor B for actuating it and a trolley device for a circuit E, a double-jointed-lever device D, flexibly connecting the said trolley device with the car, and having an upright arm $n$, pivotally supported on the car to swing transversely thereof, and an arm $m$, pivotally connected with the arm $n$ to extend at an angle therefrom and swing on its pivot through a vertical plane, substantially as described.

2. In combination with a car having an electric motor B for actuating it and a trolley device for a circuit E, a jointed-lever device D, flexibly connecting the said trolley device with the car, and a guide for an arm $m$ of the device D, secured to the machine, substantially as described.

3. In combination with a car having an electric motor B for actuating it and a trolley device for a circuit E, a guide, and a jointed-lever device D, comprising arms $n$ and $m$, the former pivoted at its lower end to the car and the latter to the upper end of the arm $n$, and controlled by the guide and connected with the trolley device, substantially as described.

4. In combination with a car having an electric motor B for actuating it and a trolley device for a circuit E, a guide, and a jointed-lever device D, comprising an arm $n$, pivoted at its lower end to the machine, and arms $m$, each pivoted at one end to the upper end of the arm $n$ and controlled by the guide, and each connected at its opposite end with the contact-rollers $p$ and $p'$ of the trolley device, substantially as described.

FORÉE BAIN.

In presence of—
J. W. DYRENFORTH,
M. J. FROST.